No. 635,083. Patented Oct. 17, 1899.
G. SUMNER & H. A. WEBBER.
PRESS.
(Application filed May 10, 1899.)
(No Model.) 2 Sheets—Sheet 1.

Witnesses:
Oscar F. Hill
Robert Wallace.

Inventors:
George Sumner
Hollis A. Webber
by W. A. Copeland
his Attorney.

No. 635,083. Patented Oct. 17, 1899.
G. SUMNER & H. A. WEBBER.
PRESS.
(Application filed May 10, 1899.)
(No Model.) 2 Sheets—Sheet 2.

Witnesses:
Oscar F. Hill
Robert Wallace.

Inventors:
George Sumner
Hollis A. Webber
by W. A. Copeland
his Attorney.

UNITED STATES PATENT OFFICE.

GEORGE SUMNER AND HOLLIS A. WEBBER, OF BRAINTREE, MASSACHUSETTS.

PRESS.

SPECIFICATION forming part of Letters Patent No. 635,083, dated October 17, 1899.

Application filed May 10, 1899. Serial No. 716,249. (No model.)

*To all whom it may concern:*

Be it known that we, GEORGE SUMNER and HOLLIS A. WEBBER, citizens of the United States, and residents of Braintree, in the county of Norfolk and State of Massachusetts, have invented certain new and useful Improvements in Presses, of which the following is a specification.

Our invention relates to an improvement in presses which are specially intended to press meat which has been cooked and form it into cakes or blocks for table use. Our press is adapted also for pressing other kinds of food and articles not intended for food which contain grease or other liquid matter and which it is desired to press into blocks. It is also adapted for extracting juice from fruits and berries.

The invention will now be fully described, and particularly pointed out in the claims at the end of the specification.

Figure 2:
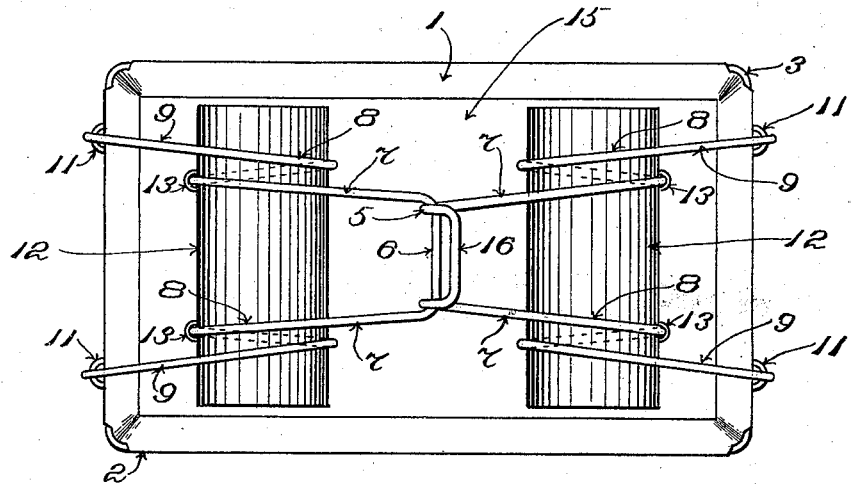
Figure 1:
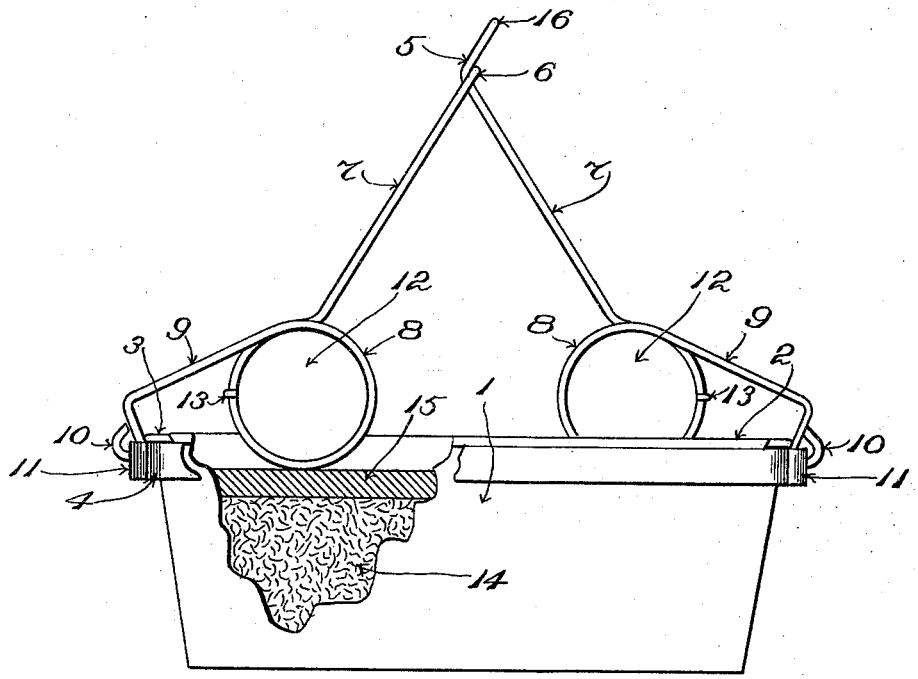
Figure 4:
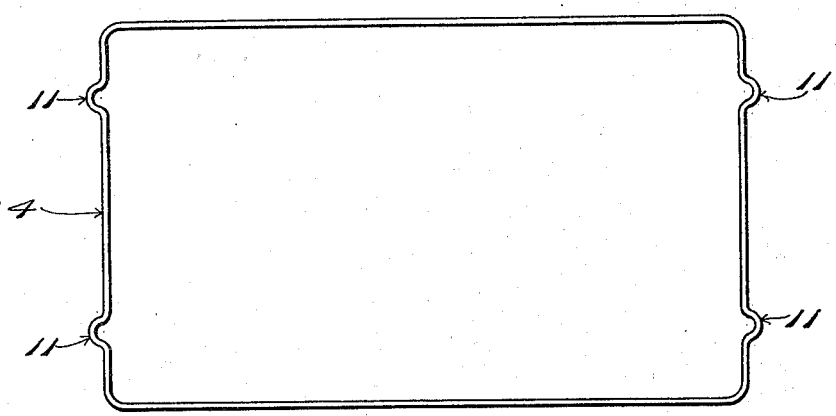
Figure 3:
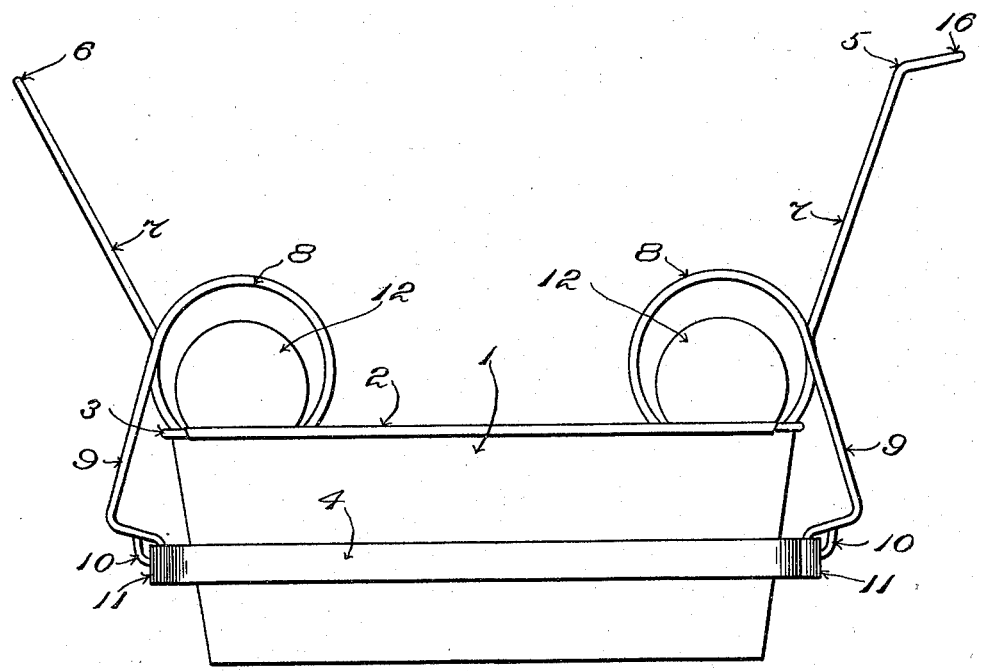

In the drawings, Figure 1 is a side elevation showing the press as it appears when the presser-arms are engaged and the pressure is applied. Fig. 2 is a plan of Fig. 1. Fig. 3 is a side elevation with the presser-spring arms disengaged from each other. Fig. 4 is a plan of the frame with the springs removed.

The press is best used in combination with a pan of suitable form and construction, such as represented by 1 in the drawings, made to flare upward and having a rim 2 formed by turning the edge over a steel wire 3. An iron or steel base-frame 4 is formed of size and shape to admit the pan when the presser-spring arms are disengaged and thrown back. A double presser-spring is pivoted to each end of the base-frame and has arms which may be brought into engagement with each other to apply and hold the pressure. Each of the presser-springs is bent in the middle, forming a loop, the loop 5 of one being slightly narrower than the loop 6 of the other and being also turned up, so that it may pass through and lock with loop 6, as shown in Fig. 1. Both springs have arms 7, which extend back from the loops, then are wound to form the coils 8, thence have rear extensions 9, terminating in open eyes 10, which hook in ears 11 in the ends of the base-frame. A cylindrical bearing-roll 12 is inserted through the coils 8 of each spring, being preferably secured to the springs by staples 13 to prevent slipping out. These rolls 12 are of somewhat smaller diameter than the coils 8 when the springs are relaxed, as in Fig. 3, so as to allow for the contraction when the pressure is applied. The meat 14 or other substance which is to be subjected to the pressure is placed in the pan and a presser-board 15 is laid on top of the meat, while the arms of the springs are unengaged and thrown back, as in Fig. 3. The springs are then tipped over toward each other to bring the bearing-rolls 12 onto the presser-board, the base-frame 4 being drawn up against the rim 2, the arms 7 being bent at such an angle to the coils that in order to bring them together considerable pressure will be required, contracting the coils and causing the rolls 12 to press down upon the board 15. The loop 5 is passed through the loop 6, and the upturned end 16 of loop 5 will engage with the loop 6 and lock the two together. The degree of pressure will of course depend upon the tension of the springs.

It is preferable to make the presser-board 15 of smaller dimensions than the interior of the pan, so as to leave an open space around it in order that by tipping up the pan the juices or other liquid matter may be poured off. The bearing-rolls 12 have several advantages. They afford a more even pressure than would be obtained by the coils of the springs without them and they stiffen and increase the tension of the springs if made of such size that the slack is all taken up before the loops lock.

What we claim is—

1. A press comprising a base-frame, two presser-springs pivoted to opposite ends of the base-frame and engaging with each other when under tension, each spring having tension-coils which apply the pressure when the springs are locked, substantially as described.

2. A press comprising a base-frame, two double presser-springs formed of wires which are bent in the middle and form loops which lock with each other to hold the springs in pressure, both ends of the wires being pivoted to the ends of the frame, one spring opposite the other, and both branches of each spring having tension-coils which apply the pressure when the springs are locked, substantially as described.

3. A press comprising a base-frame, two double presser-springs formed of wires which are bent in the middle and form loops which lock with each other to hold the springs in pressure, the ends of the two wires being pivoted to opposite ends of the frame, both branches of each wire having tension-coils, and a bearing-roll for each spring extending through both coils, substantially as described.

4. In combination with a pan having an outwardly-projecting rim, a press comprising a base-frame which surrounds said pan and bears up against said projecting rim, two double presser-springs formed of wires which are bent in the middle and form loops which lock with each other to hold the springs in pressure, the ends of the wires being pivoted to opposite ends of the frame, both branches of each wire having tension-coils, and a bearing-roll for each spring which extends through both coils, substantially as described.

5. In combination with a pan having a projecting rim, a press comprising a base-frame which surrounds said pan and bears up against said projecting rim, two double presser-springs formed of wires which are bent in the middle and form loops which lock with each other to hold the springs in pressure, the ends of the wires being pivoted to opposite ends of the frame, both branches of each wire having tension-coils, a bearing-roll for each spring which extends through both coils, and a presser-board with which the tension-coils engage and through which the pressure is imparted when the springs are locked together, substantially as described.

In testimony whereof we have affixed our signatures in presence of two witnesses.

GEORGE SUMNER.
HOLLIS A. WEBBER.

Witnesses:
HIRAM HOLBROOK,
WM. M. PREST.